United States Patent
Sinzig et al.

(10) Patent No.: US 9,925,684 B2
(45) Date of Patent: Mar. 27, 2018

(54) CUT LENGTH INDICATING DEVICE

(71) Applicant: Robert Bosch GmbH, Stuttgart (DE)

(72) Inventors: Bruno Sinzig, Oberbipp (CH);
Christian Bermes, Rapperswil (CH);
Andreas Arn, Langendorf (CH)

(73) Assignee: Robert Bosch GmbH, Stuttgart, DE (US)

( * ) Notice: Subject to any disclaimer, the term of this patent is extended or adjusted under 35 U.S.C. 154(b) by 140 days.

(21) Appl. No.: 14/412,025

(22) PCT Filed: Jun. 14, 2013

(86) PCT No.: PCT/EP2013/062330
§ 371 (c)(1),
(2) Date: Dec. 30, 2014

(87) PCT Pub. No.: WO2014/005820
PCT Pub. Date: Jan. 9, 2014

(65) Prior Publication Data
US 2015/0165637 A1 Jun. 18, 2015

(30) Foreign Application Priority Data

Jul. 4, 2012 (DE) .................. 10 2012 211 607
Oct. 24, 2012 (DE) .................. 10 2012 219 397

(51) Int. Cl.
*B27B 21/08* (2006.01)
*G01C 15/00* (2006.01)
(Continued)

(52) U.S. Cl.
CPC .............. *B27B 9/02* (2013.01); *B23D 59/002* (2013.01); *B23Q 17/22* (2013.01); *G01B 5/02* (2013.01)

(58) Field of Classification Search
CPC ........... B27L 39/02; B23Q 17/22; G01B 5/02; B23D 59/002
(Continued)

(56) References Cited

U.S. PATENT DOCUMENTS 5,010,652 A * 4/1991 Miletich .............. B23D 49/167
30/393
5,038,481 A * 8/1991 Smith .................. B23D 59/003
30/123
(Continued)

FOREIGN PATENT DOCUMENTS

| CN | 2561565 Y | 7/2003 |
| CN | 1448238 A | 10/2003 |

(Continued)

OTHER PUBLICATIONS

International Search Report corresponding to PCT Application No. PCT/EP2013/062330, dated Oct. 1, 2013 (German and English language document) (7 pages).

Primary Examiner — Ghassem Alie
Assistant Examiner — Bharat C Patel
(74) Attorney, Agent, or Firm — Maginot, Moore & Beck LLP

(57) ABSTRACT

A cut length indicating device for a portable machine tool includes at least one indication unit. The indication unit has at least one movably mounted indication element that is configured to indicate at least one position of a cutting edge of a machining tool on a work piece to be machined with reference to a set cutting depth of the machining tool. The indication element further has a cutting edge indication line, which runs at least substantially transversely to a movement plane of the indication element in order to indicate the position of the cutting edge in at least one operating state.

6 Claims, 8 Drawing Sheets

(51) Int. Cl.
*G01D 21/00* (2006.01)
*B23B 49/00* (2006.01)
*B23Q 17/22* (2006.01)
*B27G 23/00* (2006.01)
*B27B 9/02* (2006.01)
*B23D 59/00* (2006.01)
*G01B 5/02* (2006.01)

(58) Field of Classification Search
USPC ............. 30/505; 83/477.1; 33/286, 630, 640
See application file for complete search history.

(56) References Cited

U.S. PATENT DOCUMENTS

| | | | | |
|---|---|---|---|---|
| 5,285,708 | A * | 2/1994 | Bosten | B23D 33/12 |
| | | | | 362/89 |
| 5,461,790 | A * | 10/1995 | Olstowski | B23Q 17/24 |
| | | | | 30/390 |
| 5,555,630 | A | 9/1996 | De Souza | |
| 5,570,511 | A * | 11/1996 | Reich | B27B 9/02 |
| | | | | 30/376 |
| 5,675,899 | A * | 10/1997 | Webb | B23D 59/003 |
| | | | | 30/390 |
| 5,996,460 | A * | 12/1999 | Waite | B23D 33/12 |
| | | | | 30/123 |
| 6,384,397 | B1 | 5/2002 | Takiar et al. | |
| 6,497,168 | B1 * | 12/2002 | Levine | B23D 59/003 |
| | | | | 30/390 |
| 6,878,954 | B2 * | 4/2005 | Butler | B23D 59/002 |
| | | | | 250/559.29 |
| 6,918,331 | B2 * | 7/2005 | Okouchi | B23D 59/00 |
| | | | | 30/376 |
| 7,267,039 | B2 * | 9/2007 | Liao | B23D 59/003 |
| | | | | 362/259 |
| 7,384,220 | B2 * | 6/2008 | Clark | B23Q 3/183 |
| | | | | 408/13 |
| 7,387,058 | B2 * | 6/2008 | Ushiwata | B23D 59/003 |
| | | | | 362/259 |
| 7,430,810 | B2 * | 10/2008 | Sergyeyenko | G01B 3/56 |
| | | | | 33/286 |
| 8,004,664 | B2 * | 8/2011 | Etter | B23B 25/06 |
| | | | | 356/139.01 |
| 8,060,235 | B2 * | 11/2011 | Johnson | B23D 45/044 |
| | | | | 30/166.3 |
| 8,136,434 | B2 * | 3/2012 | Casella | B23D 59/002 |
| | | | | 83/174 |
| 8,176,824 | B2 * | 5/2012 | Lawlor | B23D 45/044 |
| | | | | 83/471.3 |
| 8,276,281 | B2 * | 10/2012 | Zhang | B23D 59/003 |
| | | | | 30/376 |
| 8,359,960 | B2 * | 1/2013 | Ushiwata | B23D 59/003 |
| | | | | 83/468.3 |
| 8,826,548 | B2 * | 9/2014 | Kaiser | B23D 49/167 |
| | | | | 144/154.5 |
| 9,114,493 | B2 * | 8/2015 | Pettersson | B25H 1/0092 |
| 9,242,304 | B2 * | 1/2016 | Martin | B23D 59/006 |
| 9,358,698 | B2 * | 6/2016 | Karrar | B23D 59/002 |
| 2002/0034022 | A1 | 3/2002 | Nakamura | |
| 2002/0131267 | A1 * | 9/2002 | Van Osenbruggen | B23D 59/003 |
| | | | | 362/109 |
| 2006/0101969 | A1 * | 5/2006 | Garcia | B23D 59/003 |
| | | | | 83/477.2 |
| 2006/0277768 | A1 * | 12/2006 | van Rijen | B23D 59/003 |
| | | | | 30/388 |
| 2009/0077817 | A1 * | 3/2009 | Gibbons | B23D 49/162 |
| | | | | 30/392 |

FOREIGN PATENT DOCUMENTS

| | | | | |
|---|---|---|---|---|
| CN | 1714972 A | | 1/2006 | |
| DE | 1 887 935 U | | 2/1964 | |
| DE | 90 10 716.0 U | | 10/1990 | |
| DE | 42 27 765 A1 | | 7/1993 | |
| DE | 10 2008 046 705 A1 | | 3/2010 | |
| EP | 2 163 336 A2 | | 3/2010 | |
| JP | 2001-36799 A | | 2/2001 | |
| JP | 2012101287 A * | | 5/2012 | |
| WO | 94/05514 A1 | | 3/1994 | |
| WO | 01/91193 A2 | | 11/2001 | |
| WO | WO 2010136237 A1 * | | 12/2010 | ............ G01B 21/02 |

\* cited by examiner ing Nos. DE 10 2012 211 607.9, filed on Jul. 4, 2012 and DE 10 2012 219 397.9, filed on Oct. 24, 2012 in Germany, the disclosures of which are incorporated herein by reference in their entirety.

BACKGROUND

Cut length indicating devices for machine tools, which have an indicating unit, which comprises a movably mounted indicating element, for indicating at least one position of a cutting edge of a machining tool on a workpiece, which is to be machined, in dependence on a set depth of cut of the machining tool, are already known.

SUMMARY

The disclosure is based on a cut length indicating device for a machine tool, with at least one indicating unit, which comprises at least one movably mounted indicating element, for indicating at least one position of a cutting edge of a machining tool on a workpiece, which is to be machined, in dependence on a set depth of cut of the machining tool.

It is proposed that, in at least one operating state, for indicating the position of the cutting edge, the indicating element has a cutting edge indicating line running at least substantially transversely with respect to a plane of movement of the indicating element. In at least one operating state, for indicating the position of the cutting edge, the indicating element particularly preferably has a cutting edge indicating line running at least substantially transversely with respect to a plane of movement of the indicating element and/or at least substantially transversely with respect to a cutting plane of the machining tool, on a workpiece to be machined. The indicating element here is preferably mounted movably at least in the plane of movement of the indicating element, said plane of movement running at least substantially parallel to the cutting plane of the machining tool. "Substantially parallel" is intended here to be understood as meaning, in particular, an alignment of a direction relative to a reference direction, in particular in a plane, wherein the direction has a deviation in particular of smaller than 8°, advantageously smaller than 5° and particularly advantageously, smaller than 2° in relation to the reference direction. Cutting edges of cutting teeth of the machining tool preferably run at least substantially transversely with respect to the cutting plane of the machining tool. "At least substantially transversely" is intended here to be understood as meaning in particular an alignment of a plane and/or of a direction relative to a further plane and/or to a further direction, said alignment preferably deviating from a parallel alignment of the plane and/or of the direction relative to the further plane and/or the further direction. The machining tool is preferably designed as a circular saw blade. In order to introduce a cut into the workpiece, the machining tool therefore carries out a rotating movement preferably in the cutting plane of the machining tool. In order to introduce a cut into the workpiece, the cutting plane preferably runs at least substantially transversely with respect to a workpiece surface of the workpiece to be machined.

The indicating element can be mounted in a translatorially and/or rotatorially movable manner in the plane of movement of the indicating element. The indicating element is preferably mounted movably on a curved path. The cutting edge indicating line depicted on the workpiece by the indicating element in at least one operating state has a maximum length which is in particular longer than 2 mm, is preferably longer than 5 mm and is particularly preferably longer than 10 mm, or the cutting edge indicating line depicted on the workpiece by the indicating element in at least one operating state is formed by a transverse extent, in particular by a diameter, of a light beam. When the cutting edge indicating line is configured as a transverse extent of a light beam, the cutting edge indicating line preferably has a maximum extent which is smaller than 2 mm. The cutting edge indicating line here can be formed by the indicating element itself or by a light beam produced and projected by the indicating element, in particular by a laser beam produced and projected by the indicating element. Preferably, in order to form the cutting edge indicating line, a light beam emitted by the indicating element, in particular a laser beam emitted by the indicating element, at least partially runs at least substantially parallel to the plane of movement of the indicating element. Particularly preferably, in order to form the cutting edge indicating line, a light beam emitted by the indicating element, in particular a laser beam emitted by the indicating element, runs, at least for the most part, at least substantially parallel to the plane of movement of the indicating element. The cutting edge indicating line here is preferably depicted as a spot-type depiction of a laser beam on the workpiece. The cutting edge indicating line preferably indicates at least one outlet point or inlet point of the machining tool, in particular of cutting edges of the machining tool, from or into a workpiece, which is to be machined, on a workpiece surface of the workpiece, at which outlet point or inlet point the machining tool, during machining of the workpiece, would emerge from the workpiece or would enter into the workpiece, or emerges from the workpiece or enters into the workpiece, as a result of the machining tool reaching a set depth of cut, in particular in a manner decoupled from a traveling movement of the portable machine tool on the workpiece surface of the workpiece.

The indicating element depicts the cutting edge indicating line preferably at least substantially transversely, in particular at least substantially perpendicularly, with respect to the cutting plane of the machining tool on the workpiece. By means of the configuration according to the disclosure of the cut length indicating device, an operator can advantageously be indicated a cutting edge indicating line which can be comfortably read, in particular when the cut length indicating device is arranged on a side of a protection unit of the portable machine tool, which side faces away from an operator. In addition, an operator can advantageously be indicated an outlet point or an inlet point of the machining tool from or into the workpiece even before the machining tool is inserted, while the machining tool is, for example, still completely retracted into a protection unit of the portable machine tool.

Furthermore, it is proposed that the indicating unit has at least one further movably mounted indicating element which, in at least one operating state, for indicating at least one position of a further cutting edge of the machining tool, has a further cutting edge indicating line running at least substantially transversely with respect to a plane of movement of the further indicating element. In at least one operating state, for indicating the position of the further cutting edge, the further indicating element particularly preferably has a further cutting edge indicating line running at least substantially transversely with respect to a plane of movement of the indicating element and/or at least substantially transversely with respect to a cutting plane of the machining tool. The further indicating element preferably depicts a further cutting edge indicating line, which corresponds to an inlet point of the machining tool, on the workpiece. The indicating element here preferably depicts a cutting edge indicating line, which corresponds to an outlet point of the machining tool, on the workpiece. An indication of a length of a cut, which can be introduced into the workpiece, of the machining tool, in particular in a manner decoupled from a traveling movement of the portable machine tool on the workpiece surface of the workpiece, can be achieved in a particularly advantageous manner in dependence on a set depth of cut of the machining tool. A high level of operating comfort for an operator can therefore advantageously be achieved.

Furthermore, it is proposed that the cutting edge indicating line comprises at least one movement coupling unit which connects the indicating element and a further indicating element of the indicating unit to each other in a motionally dependent manner. "Connect in a motionally dependent manner" is intended to be understood here as meaning in particular a connection of at least two elements by means of a mechanism, such as, for example, by means of a gearing or by means of a direct connection, by means of which the two elements are moved together, in particular at least substantially isochronously. The movement coupling unit here can be designed as a rack coupling unit, as a rod coupling unit, as a gear wheel coupling unit, etc., which connects the indicating element and the further indicating element to each other in a motionally dependent manner. By means of the configuration according to the disclosure, a joint movement of the indicating element and of the further indicating element can advantageously be achieved. A simple setting of a position of the indicating element and of a position of the further indicating element can advantageously take place. A change in a position of the indicating element can therefore be advantageously transmitted to the further indicating element in a precise and simple manner, as a result of which a position of the further indicating element can be changed in dependence on a position of the indicating element.

In addition, it is proposed that the cut length indicating device comprises at least one movement coupling unit which has at least one movement coupling element which is connected in an articulated manner to a guide element of the movement coupling unit, on which guide element the indicating element is arranged. A "guide element" is intended to be understood here as meaning in particular an element which interacts with at least one further element in order to guide a component during a movement along a predetermined path by means of an action of at least one constraining force transversely with respect to a direction of movement. A "constraining force" is intended to be understood here as meaning in particular a force which is provided for preventing a component for moving in at least one direction and/or for holding the component during a movement on a path predetermined by means of an action of the force on the component. "Provided" is intended to be understood as meaning in particular specially programmed, designed and/or equipped. The guide element is preferably mounted pivotably and/or rotatably on the movement coupling element. By means of the configuration according to the disclosure, a movement of the indicating element can be guided in a structurally simple manner. In addition, a coupling of the movement of the indicating element in dependence on a further element, in particular a cut depth setting element of a cut depth setting unit of the portable machine tool, can be achieved in a structurally simple manner.

Furthermore, it is proposed that the guide element is guided at one end, which faces away from the movement coupling element, in at least one guide recess of the movement coupling unit. The expression "guide recess" is intended here to define in particular a recess which is provided for guiding a component during a movement along a predetermined path by means of an action of at least one constraining force transversely with respect to a direction of movement. The guide element particularly preferably engages in the guide recess. The indicating element is therefore preferably guided by means of an interaction of the guide element and of the guide recess of the movement coupling unit during a movement of the indicating element along a predetermined path. However, it is also conceivable that the indicating element is guided by means of an interaction of the guide element and a guide rib of the movement coupling unit during a movement of the indicating element along a predetermined path. By means of the configuration according to the disclosure of the cut length indicating device, a precise guidance of the indicating element can advantageously be achieved. A precise setting of a position of the indicating element can therefore advantageously be achieved.

Furthermore, it is proposed that the cut length indicating device has at least one movement coupling unit which comprises at least one guide recess which has a curved profile. The guide recess here preferably has a curved profile, as viewed along an entire extent of the guide recess. The guide recess is therefore configured as a curved path or as a curved slotted guide. However, it is also conceivable for only a partial region of the guide recess to have a curved profile which runs from a rectilinear partial region or from a partial region formed differently from a partial region running rectilinearly. Furthermore, it is conceivable that, as an alternative to the guide recess, the movement coupling unit comprises at least one guide rod which has a curved profile or a rectilinear profile and on which the indicating element and/or the further indicating element are/is movably mounted. In particular by means of a rectilinear profile of the guide rod, a constant distance of the indicating element and/or of the further indicating element relative to a support unit and/or a cutting plane of the portable machine tool can advantageously be achieved, said distance being advantageously independent of an indicating position of the indicating element and/or of the further indicating element relative to each other. By means of the configuration according to the disclosure of the cut length indicating device, a precise and structurally simple alignment of the indicating element can advantageously be achieved in dependence on a movement of a cut depth setting element of a cut depth setting unit of the portable machine tool.

In addition, it is proposed that the indicating unit is designed as a laser indicating unit. The indicating element and the further indicating element are therefore preferably in each case designed as a laser indicating element. The indicating element and the further indicating element are preferably designed as laser diodes. In at least one operating state, the indicating element and the further indicating element preferably project the cutting edge indicating line and the further cutting edge indicating line onto the workpiece to be machined. In at least one operating state, for indicating the position of the further cutting edge, the indicating element therefore particularly preferably depicts a cutting edge indicating line running at least substantially transversely with respect to a plane of movement of the indicating element and/or at least substantially transversely with respect to a cutting plane of the machining tool, on a workpiece to be machined. Furthermore, in at least one operating state, for indicating the position of the further cutting edge, the further indicating element therefore particularly preferably depicts a further cutting edge indicating line running at least substantially transversely with respect to a plane of movement of the indicating element and/or at least substantially transversely with respect to a cutting plane of the machining tool, on a workpiece to be machined. A cut length indicating device which can be read particularly comfortably can be realized.

Furthermore, the disclosure is based on a portable machine tool, in particular a circular saw, with at least one cut depth setting unit for setting a depth of cut of a machining tool and with at least one cut length indicating device according to the disclosure. A "portable machine tool" is intended to be understood here as meaning in particular a machine tool, in particular a handheld machine tool, which can be transported by an operator without a transport machine. The portable machine tool in particular has a mass which is smaller than 40 kg, preferably smaller than 10 kg and particularly preferably smaller than 5 kg. The portable machine tool is particularly preferably designed as a plunge-cut circular saw. However, it is also conceivable for the machine tool to have another configuration appearing expedient to a person skilled in the art. The cut depth setting unit is preferably provided for setting a depth of cut of the machining tool which can be coupled to a tool holding fixture of the portable machine tool. The expression "cut depth setting unit" is intended here to define in particular a unit which is provided for limiting an insertion distance of the machining tool, which is connected to the tool holding fixture of the portable machine tool, in particular a circular saw blade, into a workpiece to be machined and/or for setting a length of an insertion distance of the machining tool into the workpiece to be machined. The insertion distance of the machining tool into the workpiece to be machined is viewed here in particular along a direction running at least substantially perpendicularly to a support surface of a support unit of the portable machine tool, with which support surface the portable machine tool rests on a workpiece surface of a workpiece to be machined. The expression "substantially perpendicularly" is intended here to define in particular an alignment of a direction relative to a reference direction, wherein the direction and the reference direction, in particular as viewed in a plane, enclose an angle of 90°, and the angle has a maximum deviation of in particular smaller than 8°, advantageously smaller than 5° and particularly advantageously smaller than 2°. By means of the configuration according to the disclosure of the portable machine tool, precise machining of a workpiece by means of the portable machine tool can advantageously be achieved.

Furthermore, it is proposed that the cut length indicating device comprises at least the movement coupling unit which is provided for moving at least the indicating element in dependence on a movement of a cut depth setting element of the cut depth setting unit. The cut depth setting element is particularly preferably designed as a bit stop which limits an insertion distance of the machining tool, which is connected to a tool holding fixture of the portable machine tool, in particular a circular saw blade, into the workpiece to be machined and/or by means of which a length of the insertion distance can be set. By means of the configuration according to the disclosure, coupling of the indicating element to the cut depth setting element can advantageously be achieved. A setting of a position of the indicating element, which setting is dependent on a position of the cut depth setting element, can therefore advantageously be achieved. It is thereby possible advantageously to achieve a precise indicating of a cut length of the machining tool in dependence on a set depth of cut of the machining tool.

In addition, it is proposed that the cut depth setting unit comprises at least one movably mounted cut depth setting element which is connected to a movement coupling element of a movement coupling unit of the cut length indicating device. The movement coupling element here preferably picks up a movement of the cut depth setting element and transmits the movement to the indicating element, in particular via a guide element of the movement coupling unit. A movement dependence between the cut depth setting element and the indicating element can therefore be realized in a structurally simple manner.

The cut length indicating device according to the disclosure and/or the machine tool according to the disclosure are/is not intended to be limited here to the above-described use and embodiment. In particular, in order to carry out a manner of operation described here, the cut length indicating device according to the disclosure and/or the machine tool according to the disclosure can have a number differing from a number mentioned here of individual elements, components and units.

BRIEF DESCRIPTION OF THE DRAWINGS

Further advantages emerge from the description below of the drawing. The drawing illustrates exemplary embodiments of the disclosure. The drawing, the description and the claims contain numerous features in combination. A person skilled in the art will expediently also consider the features individually and combine them into meaningful further combinations.

In the drawing.

DETAILED DESCRIPTION

Figure 1:
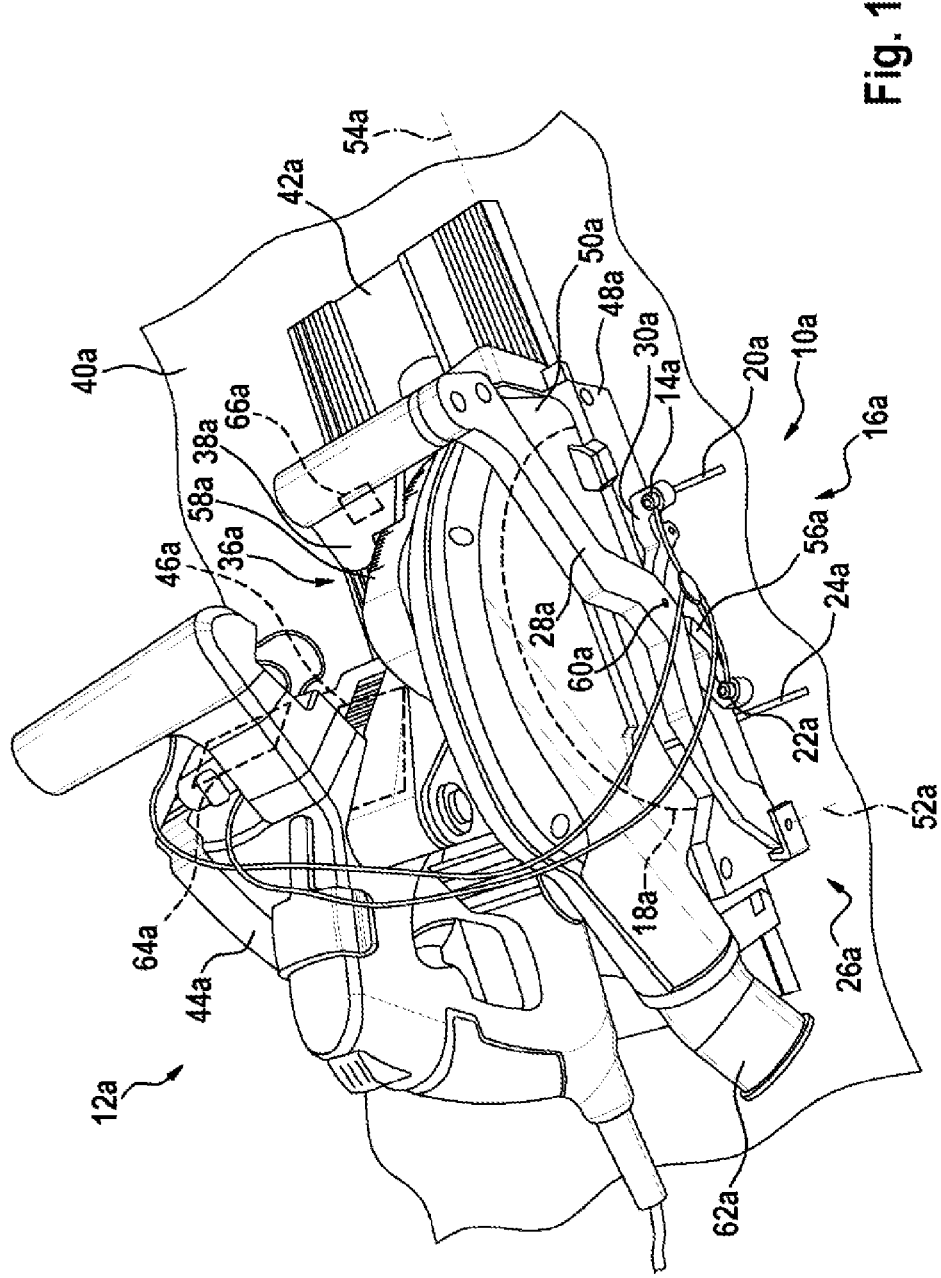
FIG. 1 shows a detailed view of a portable machine tool according to the disclosure which has a cut length indicating device according to the disclosure and a machine tool guide system, in a schematic illustration.

FIG. 1 shows a machine tool machining system which comprises at least one portable machine tool 12a designed as a plunge-cut circular saw, and at least one machine tool guide device 42a designed as a guide rail. The portable machine tool 12a designed as a plunge-cut circular saw comprises at least one cut depth setting unit 36a for setting a depth of cut of a machining tool 18a, and at least one cut length indicating device 10a. By means of setting a position of a cut depth setting element 38a, a depth of cut of the machining tool 18a can be set in a manner already known to a person skilled in the art. The machining tool 18a is connected to a tool holding fixture (not illustrated specifically here) of the portable machine tool 12a. Furthermore, the portable machine tool 12a comprises a machine tool housing 44a which is provided for surrounding a drive unit 46a of the portable machine tool 12a. The drive unit 46a comprises a drive shaft (not illustrated specifically here) which is provided for driving the machining tool 18a, which is couplable to the tool holding fixture, in a manner already known to a person skilled in the art.

Furthermore, the portable machine tool 12a comprises a support unit 48a which is designed as a base plate or as a sliding shoe and with which the portable machine tool 12a rests on a workpiece surface of the workpiece 40a or on a surface of the machine tool guide device 42a, which is designed as a guide rail, during machining of a workpiece 40a, or slides on the workpiece surface or on the surface of the machine tool guide device 42a, which is designed as a guide rail, during a movement for introducing a cut into the workpiece 40a. The support unit 48a is couplable here in a manner already known to a person skilled in the art to the machine tool guide device 42a, which is designed as a guide rail. In addition, a protection unit 50a of the portable machine tool 12a is arranged on the support unit 48a, said protection unit protecting an operator against injuries during machining of the workpiece 40a. The protection unit 50a is designed here as a guard which, in a fitted state, encloses the machining tool 18a by more than 160° along a direction of rotation of the drive shaft. The protection unit 50a furthermore has a suction extraction coupling element 62a which is connectable to a suction extraction unit (not illustrated specifically here) for extracting abraded workpiece particles by suction during machining of the workpiece 40a. The machine tool housing 44a is mounted on the protection unit 50a so as to be pivotable relative to the support unit 48a. The machine tool housing 44a here is mounted on the protection unit 50a in a manner already known to a person skilled in the art so as to be pivotable about a plunge pivot axis 52a relative to the support unit 48a. Furthermore, the machine tool housing 44a is mounted together with the protection unit 50a on the support unit 48a in a manner already known to a person skilled in the art so as to be pivotable about a tilt pivot axis 54a relative to the support unit 48a. The plunge pivot axis 52a extends at least substantially perpendicularly relative to the tilt pivot axis 54a. In addition, the cut depth setting unit 36a is arranged on a side of the protection unit 50a that faces the machine tool housing 44a.

The cut length indicating device 10a for the portable machine tool 12a has at least one indicating unit 16a, which comprises at least one movably mounted indicating element 14a, for indicating at least one position of a cutting edge of the machining tool 18a on the workpiece 40a, which is to be machined, in dependence on a set depth of cut of the machining tool 18a. The depth of cut of the machining tool 18a can be set by means of the cut depth setting unit 36a. In at least one operating state, for indicating the position of the cutting edge, the indicating element 14a has a cutting edge indicating line 20a running at least substantially transversely with respect to a plane of movement of the indicating element 14a. Furthermore, the indicating unit 16a has at least one further movably mounted indicating element 22a which, in at least one operating state, for indicating at least one position of a further cutting edge of the machining tool 18a, has a further cutting edge indicating line 24a running at least substantially transversely with respect to a plane of movement of the further indicating element 22a. The indicating unit 16a is designed as a laser indicating unit. The indicating element 14a and the further indicating element 22a are therefore designed as laser indicating elements. In at least one operating state, for indicating the position of the cutting edge, the indicating element 14a depicts the cutting edge indicating line 20a running at least substantially transversely with respect to a plane of movement of the indicating element 14a and/or at least substantially transversely with respect to a cutting plane of the machining tool 18a, on the workpiece 40a to be machined. The cutting edge indicating line 20a of the indicating element 14a is formed here by a laser line. In at least one operating state, for indicating the position of the cutting edge, the further indicating element 22a depicts the further cutting edge indicating line 24a running at least substantially transversely with respect to a plane of movement of the further indicating element 22a and/or at least substantially transversely with respect to the cutting plane of the machining tool 18a, on the workpiece 40a to be machined. The cutting edge indicating line 24a of the further indicating element 22a is likewise formed by a laser line. In a configuration (not illustrated specifically here) of the indicating unit 16a, the cutting edge indicating line 20a of the indicating element 14a and the cutting edge indicating line 24a of the further indicating element 22a are in each case formed by a laser point or by a transverse extent of a laser beam, wherein the laser beam runs at least substantially parallel to the plane of movement of the indicating element 14a or of the further indicating element 22a. In order to produce laser beams, the indicating element 14a and the further indicating element 22a are supplied with energy by an energy unit 64a of the cut length indicating device 10a or of the portable machine tool 12a. The energy unit 64a here can be formed by a separate battery pack or the energy unit 64a is electrically connected electrically to an energy supply unit (not illustrated specifically here) of the portable machine tool 12a.

The cutting edge indicating line 20a depicted by the indicating element 14a on the workpiece 40a is provided here for indicating a position of a front cutting edge of the machining tool 18a, as viewed along a direction running counter to a direction of movement of the portable machine tool 12a for introducing a cut into the workpiece 40a, on the workpiece 40*a* to be machined. The front cutting edge of the machining tool 18*a* corresponds to a front outlet edge of cutting edges of the machining tool 18*a* from the workpiece 40*a*, which is to be machined, when a depth of cut, set by means of the cut depth setting unit 36*a*, of the machining tool 18*a* is reached. The further cutting edge indicating line 24*a* is provided for indicating a position of a rear cutting edge of the machining tool 18*a*, as viewed along the direction running counter to the direction of movement of the portable machine tool 12*a* for introducing a cut into the workpiece 40*a*, on the workpiece 40*a* to be machined. The rear cutting edge of the machining tool 18*a* corresponds to a rear inlet edge of cutting edges of the machining tool 18*a* into the workpiece 40*a*, which is to be machined, when a depth of cut, which is set by means of the cut depth setting unit 36*a*, of the machining tool 18*a* is reached.

Furthermore, the cut length indicating device 10*a* comprises at least one movement coupling unit 26*a* which connects the indicating element 14*a* and the further indicating element 22*a* of the indicating unit 16*a* to each other in a motionally dependent manner (FIGS. 1 to 4). The movement coupling unit 26*a* has at least one movement coupling element 28*a* which is connected in an articulated manner to a guide element 30*a* of the movement coupling unit 26*a*, on which guide element the indicating element 14*a* is arranged. Furthermore, the movement coupling unit 26*a* has at least one further guide element 56*a* which is connected in an articulated manner to the movement coupling element 28*a* and on which the further indicating element 22*a* is arranged. The movement coupling element 28*a* is designed as a movement coupling rod. However, it is also conceivable that the movement coupling element 28*a* has another configuration appearing expedient to a person skilled in the art, such as, for example, a configuration as a gearwheel, as a rack, as a cam gearing element, etc. The movement coupling element 28*a* is mounted pivotably at one end on the support unit 48*a* and/or on the protection unit 50*a*. The pivot axis of the movement coupling element 28*a* runs coaxially with respect to the plunge pivot axis 52*a* of the machine tool housing 44*a*. The movement coupling element 28*a* is connected at a further end of the movement coupling element 28*a* to the cut depth setting element 38*a* of the cut depth setting unit 36*a*.

Figure 2:
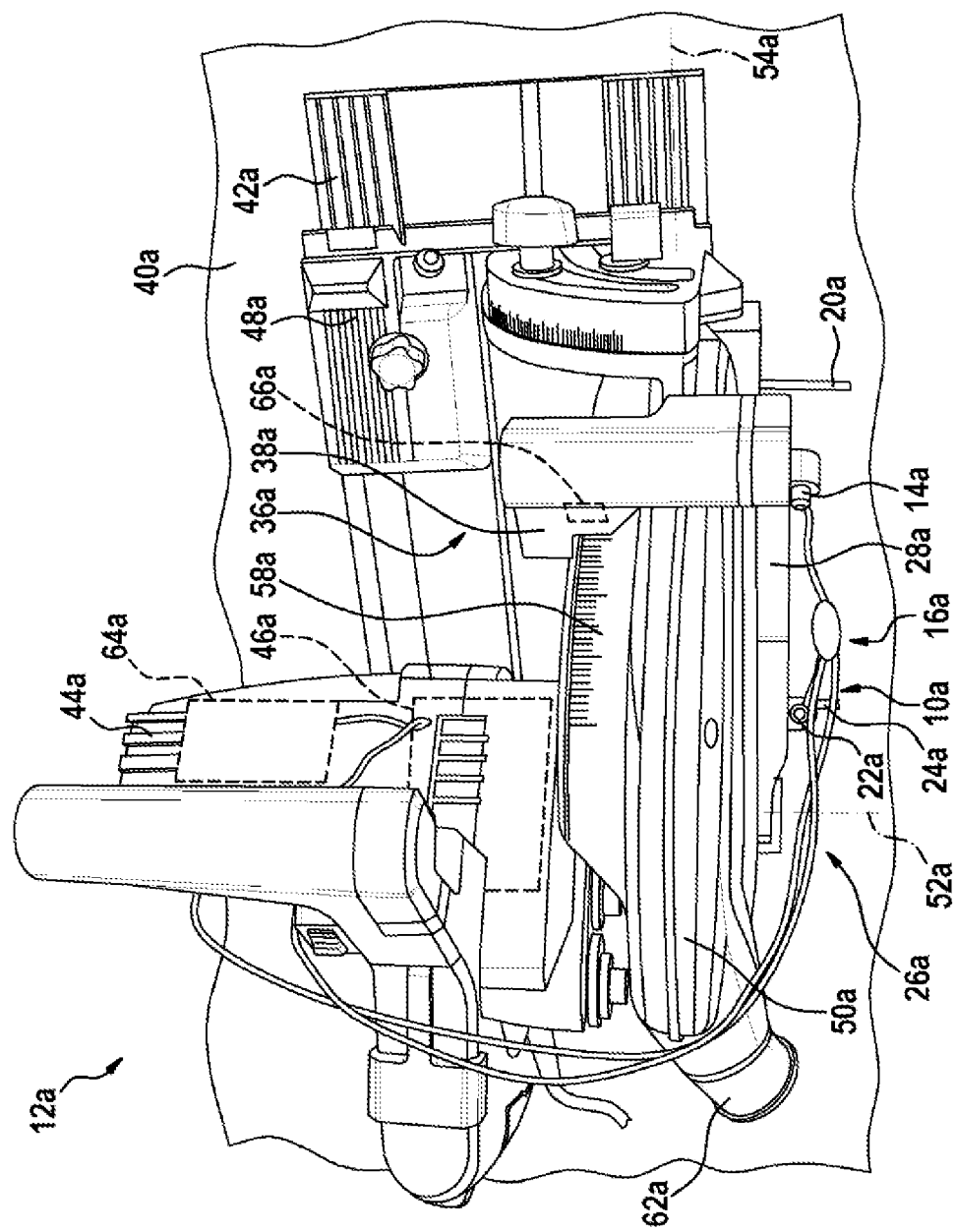
FIG. 2 shows a further detailed view of the portable machine tool according to the disclosure which has the cut length indicating device according to the disclosure, and the machine tool guide system from FIG. 1, in a schematic illustration.

The cut depth setting element 38*a* is mounted movably on a guide path element 58*a* of the cut depth setting unit 36*a* in order to set a depth of cut of the machining tool 18*a* (FIG. 2). The cut depth setting unit 36*a* therefore has at least the movably mounted cut depth setting element 38*a* which is connected to the movement coupling element 28*a* of the movement coupling unit 26*a* of the cut length indicating device 10*a*. The guide path element 58*a* is arranged on a side of the protection unit 50*a* that faces the machine tool housing 44*a*. During a movement of the cut depth setting element 38*a* relative to the guide path element 58*a*, the movement coupling element 28*a* as a result of the connection to the cut depth setting element 38*a* is likewise moved relative to the guide path element 58*a* along a course of the guide path element 58*a*.

Figure 3:
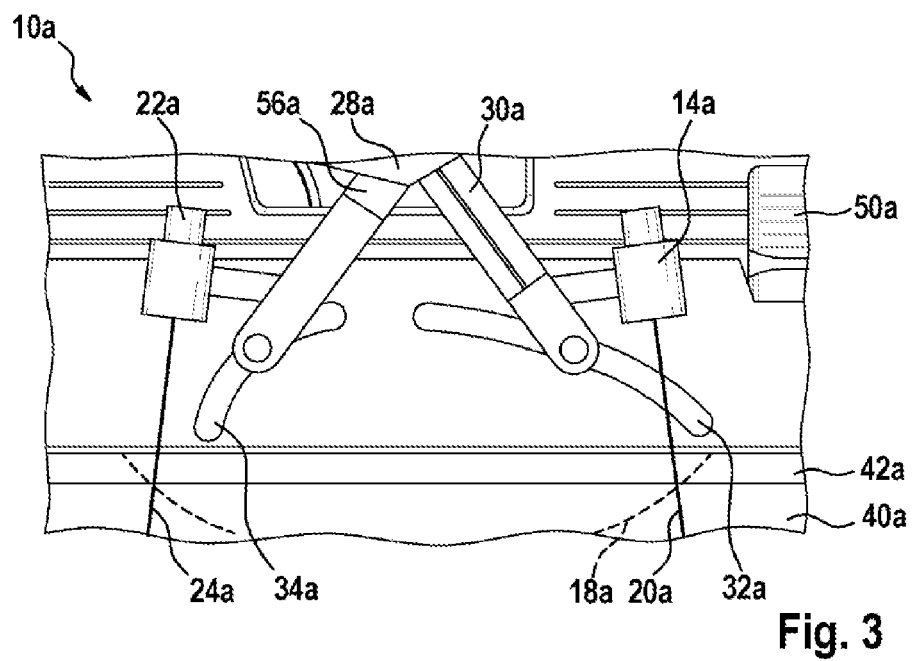
FIG. 3 shows a detailed view of a guide recess and of a further guide recess of a movement coupling unit of the cut length indicating device according to the disclosure, in a schematic illustration.
Figure 4:
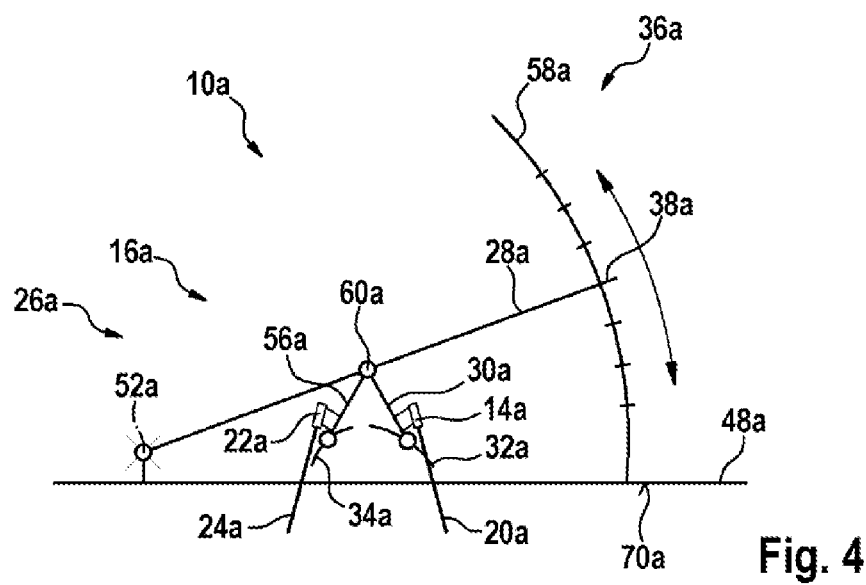
FIG. 4 shows a schematic diagram of the cut length indicating device according to the disclosure in a schematic illustration.

The guide element 30*a* and the further guide element 56*a* are connected in an articulated manner to the movement coupling element 28*a* by means of a bearing bolt element 60*a* of the movement coupling unit 26*a* (FIGS. 1 and 4). In addition, the guide element 30*a* is guided at one end, which faces away from the movement coupling element 28*a*, in at least one guide recess 32*a* of the movement coupling unit 26*a*. The further guide element 56*a* is likewise guided at one end, which faces away from the movement coupling element 28*a*, in at least one further guide recess 34*a* of the movement coupling unit 26*a*. The guide recess 32*a* has a curved profile. The further guide recess 34*a* likewise has a curved profile (FIG. 3). The guide recess 32*a* and the further guide recess 34*a* here have a convex configuration, as viewed along a direction starting from the support unit 48*a* and directed toward the machine tool housing 44*a*. The curved profile of the guide recess 32*a* and the curved profile of the further guide recess 34*a* are designed in such a manner that the indicating element 14*a* and the further indicating element 22*a* are moved relative to each other by means of the movement coupling element 28*a* in dependence on a movement of the cut depth setting element 38*a* in order to form cutting edge indicating lines 20*a*, 24*a* which are precisely aligned with an outlet or inlet cutting edge of the machining tool 18*a*, which outlet or inlet cutting edge is produced by the machining tool 18*a* in the plunge position in the workpiece 40*a* on being decoupled from a traveling movement after striking against the cut depth setting element 38*a*, or between which points the machining tool 18*a* protrudes from the protection unit 50*a* and/or from the support unit 48*a* in the plunge position after striking against the cut depth setting element 38*a*, in order to introduce a cut into the workpiece 40*a*.

As a result of setting a desired maximum depth of cut of the machining tool 18*a* by means of the cut depth setting unit 36*a*, the indicating element 14*a* and the further indicating element 22*a* are moved relative to each other. A movement of the cut depth setting element 38*a* relative to the guide path element 58*a* is picked up here by the movement coupling element 28*a*. The movement coupling element 28*a* is therefore moved together with the cut depth setting element 38*a* relative to the guide path element 58*a*. The movement of the movement coupling element 28*a* is transmitted here to the indicating element 14*a* and the further indicating element 22*a* by means of the connection of the movement coupling element 28*a*, of the guide element 30*a* and of the further guide element 56*a*. As a result of the guidance of the guide element 30*a* in the guide recess 32*a* and as a result of the guidance of the further guide element 56*a* in the further guide recess 34*a*, the indicating element 14*a* and the further indicating element 22*a* are moved in dependence on a movement of the cut depth setting element 38*a*. A distance between the cutting edge indicating line 20*a* formed by the indicating element 14*a* and the further cutting edge indicating line 24*a* formed by the further indicating element 22*a* correspond here to a length of a cut of the machining tool 18*a*, if the machining tool 18*a* is pivoted about the plunge pivot axis 52*a* until the machine tool housing 44*a* strikes against the cut depth setting element 38*a*. The cut length indicating device 10*a* therefore comprises at least the movement coupling unit 26*a* which is provided for moving at least the indicating element 14*a* and the further indicating element 22*a* in dependence on a movement of the cut depth setting element 38*a* of the cut depth setting unit 36*a*. For this purpose, FIG. 4 shows a schematic diagram of the movement coupling unit 26*a* for moving the indicating element 14*a* and the further indicating element 22*a* in dependence on a movement of the cut depth setting element 38*a*.

Furthermore, the cut length indicating device 10*a* has at least one guide rail difference compensating unit 66*a* which is provided for taking into consideration a thickness of the machine tool guide device 42*a* during an indication of the cutting edge indicating lines 20*a*, 24*a*. The guide rail difference compensating unit 66*a* can be formed electronically and/or mechanically. It is therefore ensured that the cutting edge indicating lines 20*a*, 24*a* formed by the indicating element 14*a* and the further indicating element 22*a* are precisely aligned with an outlet or inlet cutting edge of the machining tool 18a independently of the machine tool guide device 42a being used or not being used together with the portable machine tool 12a. However, it is also conceivable that the cut length indicating device 10a is designed in a manner decoupled from the guide rail difference compensating unit 66a and is designed for use of the cut length indicating device 10a or of the portable machine tool 12a and of the cut length indicating device 10a with a machine tool guide device 42a as early as when the cut length indicating device 10a is assembled at the factory. During a movement of the indicating element 14a and of the further indicating element 22a in dependence on the cut depth setting element 38a, a thickness of the machine tool guide device 42a would already be taken into consideration here during a design of the guide recess 32a and of the further guide recess 34a.

FIGS. 5 to 11 illustrate alternative exemplary embodiments. Components, features and functions which remain substantially the same are basically numbered with the same reference numbers. In order to distinguish between the exemplary embodiments, the letters a to c are added to the reference numbers of the exemplary embodiments. The description below is restricted essentially to the differences from the first exemplary embodiment described in FIGS. 1 to 4, wherein reference can be made to the description of the first exemplary embodiment in FIGS. 1 to 4 with respect to components, features and functions which remain the same.

Figure 5:
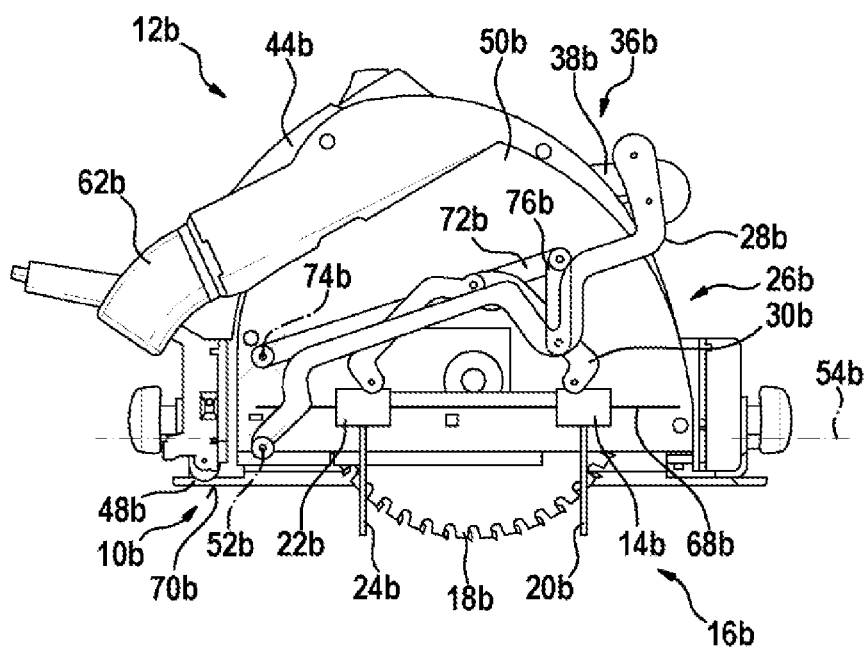
FIG. 5 shows a detailed view of a portable machine tool according to the disclosure which has an alternative cut length indicating device according to the disclosure, in a schematic illustration.

FIG. 5 shows a portable machine tool 12b which is designed as a plunge-cut circular saw and comprises at least one cut depth setting unit 36b for setting a depth of cut of a machining tool 18b, and at least one cut length indicating device 10b. The portable machine tool 12b has an at least substantially analogous configuration to the portable machine tool 12a described in FIGS. 1 to 4. The cut length indicating device 10b for the portable machine tool 12b comprises at least one indicating unit 16b, which comprises at least one movably mounted indicating element 14b, for indicating at least one position of a cutting edge of the machining tool 18b on a workpiece (not illustrated specifically here), which is to be machined, in dependence on a set depth of cut of the machining tool 18b. The depth of cut of the machining tool 18b can be set by means of the cut depth setting unit 36b. In at least one operating state, for indicating the position of the cutting edge, the indicating element 14b has a cutting edge indicating line 20b running at least substantially transversely with respect to a plane of movement of the indicating element 14b.

Furthermore, the indicating unit 16b has at least one further movably mounted indicating element 22b which, in at least one operating state, for indicating at least one position of a further cutting edge of the machining tool 18b, has a further cutting edge indicating line 24b running at least substantially transversely with respect to a plane of movement of the further indicating element 22b. The indicating unit 16b is designed as a laser indicating unit. The indicating element 14b and the further indicating element 22b are therefore designed as laser indicating elements. In at least one operating state, for indicating the position of the cutting edge, the indicating element 14b depicts the cutting edge indicating line 20b running at least substantially transversely with respect to a plane of movement of the indicating element 14b and/or at least substantially transversely with respect to a cutting plane of the machining tool 18b, on the workpiece 40b to be machined. The cutting edge indicating line 20b of the indicating element 14b is formed here by a laser line. In at least one operating state, for indicating the position of the cutting edge, the further indicating element 22b depicts the further cutting edge indicating line 24b running at least substantially transversely with respect to a plane of movement of the further indicating element 22b and/or at least substantially transversely with respect to the cutting plane of the machining tool 18b, on the workpiece 40b to be machined. The cutting edge indicating line 24b of the further indicating element 22b is likewise formed by a laser line. The indicating element 14b and the further indicating element 22b are mounted on a longitudinal guide element 68b of the cut length indicating device 10b in a translatorially movable manner. The longitudinal guide element 68b is designed as a guide rod on which the indicating element 14b and the further indicating element 22b are mounted in a translatorially movable manner. Furthermore, when the cut length indicating device 10b is arranged on the portable machine tool 12b, the longitudinal guide element 68b runs at least substantially parallel to a support surface 70b of a support unit 48b of the portable machine tool 12b. During machining of a workpiece, the portable machine tool 12b rests with the support surface 70b on a workpiece surface of the workpiece or on a surface of a machine tool guide device (not illustrated specifically here), which is designed as a guide rail.

Figure 6:
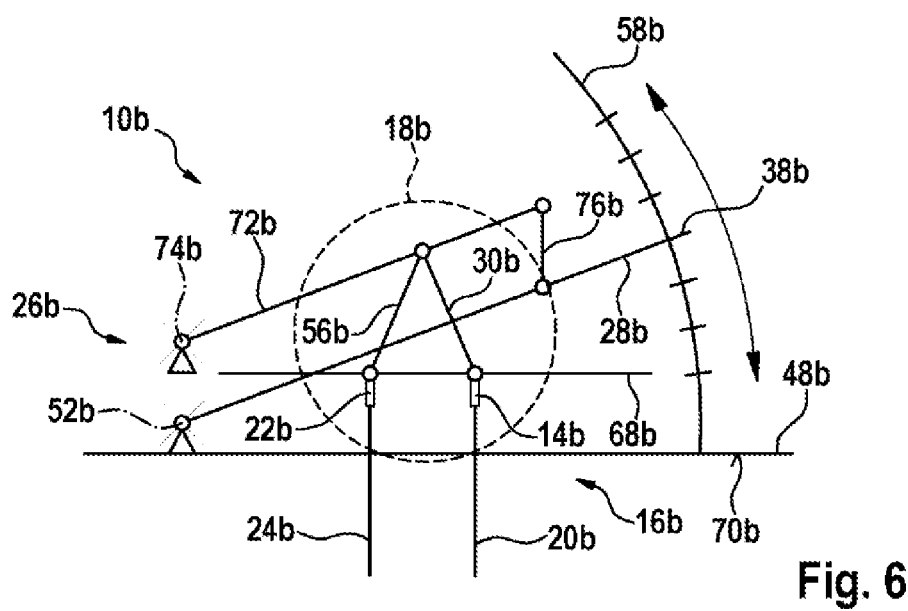
FIG. 6 shows a schematic diagram of the alternative cut length indicating device according to the disclosure from FIG. 5, in a schematic illustration.

Furthermore, the cut length indicating device 10b comprises at least one movement coupling unit 26b which connects the indicating element 14b and the further indicating element 22b of the indicating unit 16b to each other in a motionally dependent manner. The movement coupling unit 26b is designed as a parallelogram movement coupling unit. The movement coupling unit 26b here comprises at least one movement coupling element 28b which is mounted pivotably at one end on the support unit 48b and/or on a protection unit 50b of the portable machine tool 12b. A pivot axis of the movement coupling element 28b runs coaxially with respect to a plunge pivot axis 52b of a machine tool housing 44b of the portable machine tool 12b. The movement coupling element 28b is connected at a further end of the movement coupling element 28b to a cut depth setting element 38b of the cut depth setting unit 36b. The cut depth setting element 38b is mounted movably on a guide path element 58b of the cut depth setting unit 36b for setting a depth of cut of the machining tool 18b (FIG. 6). The cut depth setting unit 36b therefore has at least the movably mounted cut depth setting element 38b which is connected to the movement coupling element 28b of the movement coupling unit 26b of the cut length indicating device 10b. The guide path element 58b is arranged on a side of the protection unit 50b of the portable machine tool 12b that faces the machine tool housing 44a. During a movement of the cut depth setting element 38b relative to the guide path element 58b, the movement coupling element 28b as a result of the connection to the cut depth setting element 38b is likewise moved relative to the guide path element 58b along a course of the guide path element 58b. The cut length indicating device 10b can be covered here by means of a covering hood in order to protect the movement coupling unit 26b and/or the indicating unit 16b.

Furthermore, the movement coupling unit 26b comprises a further movement coupling element 72b which is mounted pivotably on the support unit 48b and/or on the protection unit 50b. A pivot axis 74b of the further movement coupling element 72b runs at least substantially parallel to the pivot axis of the movement coupling element 28b or to the plunge pivot axis 52b. The movement coupling element 28b and the further movement coupling element 72b are aligned at least substantially parallel to each other, as viewed along a longitudinal extent of the further movement coupling element 72b. In addition, the movement coupling element 28b and the further movement coupling element 72b are connected to each other by means of a connecting element 76b of the movement coupling unit 26b. The connecting element 76b is designed as a connecting rod. The connecting element 76b here is mounted rotatably on the movement coupling element 28b. In addition, the connecting element 76b is mounted rotatably on the further movement coupling element 72b. A maximum longitudinal extent of the connecting element 76b corresponds here to a distance, which extends along a direction running at least substantially perpendicular to the support surface 70b, between the pivot axis of the movement coupling element 28b and the pivot axis 74b of the further movement coupling element 72b. Furthermore, a distance between the longitudinal guide element 68b and the support surface 70b of the support unit 48b likewise corresponds to the distance, which extends along a direction running at least substantially perpendicular to the support surface 70b, between the pivot axis of the movement coupling element 28b and the pivot axis 74b of the further movement coupling element 72b.

Furthermore, the movement coupling unit 26b comprises at least one guide element 30b which is mounted pivotably on the further movement coupling element 72b (FIG. 6). In addition, the guide element 30b is mounted pivotably on the indicating element 14b. Furthermore, the movement coupling unit 26b comprises at least one further guide element 56b which is mounted pivotably on the further movement coupling element 72b (FIG. 6). The guide element 30b and the further guide element 56b are mounted pivotably here at the same bearing point on the further movement coupling element 72b (FIG. 6). Furthermore, the further guide element (56b) is mounted pivotably on the further indicating element 22b. A distance between the bearing point and the pivot axis 74b of the further movement coupling element 72b corresponds with respect to size to a distance between the plunge pivot axis 52b and an axis of rotation of an output shaft of the portable machine tool 12b or to a center point of the machining tool 18b which is designed as a circular saw blade and is arranged on a tool holding fixture of the portable machine tool 12b.

As a result of setting a desired maximum depth of cut of the machining tool 18b by means of the cut depth setting unit 36b, the indicating element 14b and the further indicating element 22b are moved relative to each other. In this connection, a movement of the cut depth setting element 38b relative to the guide path element 58b is picked up by the movement coupling element 28b. The movement coupling element 28b is therefore moved together with the cut depth setting element 38b relative to the guide path element 58b. The movement of the movement coupling element 28b here is transmitted to the indicating element 14b and to the further indicating element 22b by means of the connection of the movement coupling element 28b and of the further movement coupling element 72b by means of the connecting element 76b, and by means of the connection of the guide element 30b and of the further guide element 56b to the further movement coupling element 72b. As a result of the translatorily movable mounting of the indicating element 14b and of the further indicating element 22b on the longitudinal guide element 68b, the indicating element 14b and the further indicating element 22b are moved in dependence on a movement of the cut depth setting element 38b. With regard to further features of the portable machine tool 12b and/or of the cut length indicating device 10b, reference should be made to the portable machine tool 12a and/or cut length indicating device 10a described in FIGS. 1 to 4.

Figure 7:
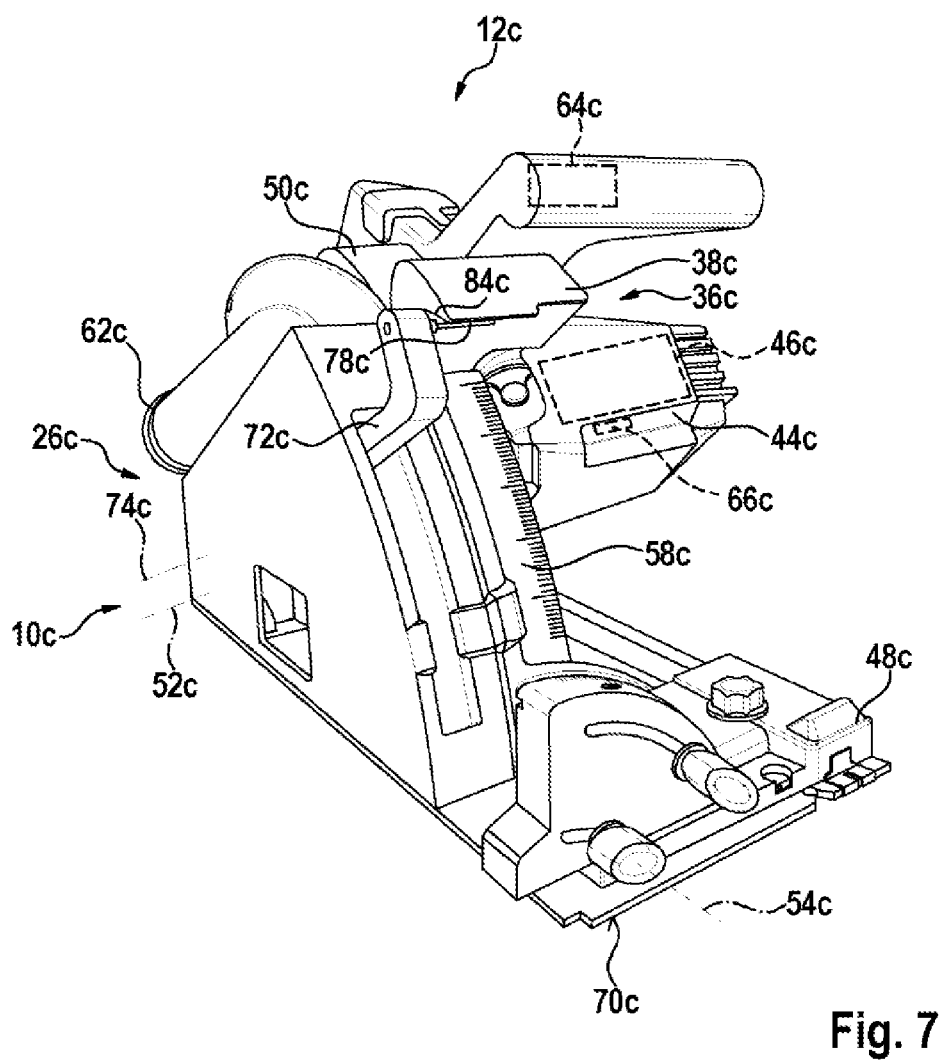
FIG. 7 shows a detailed view of a portable machine tool according to the disclosure which has a further, alternative cut length indicating device according to the disclosure, in a schematic illustration.
Figure 8:
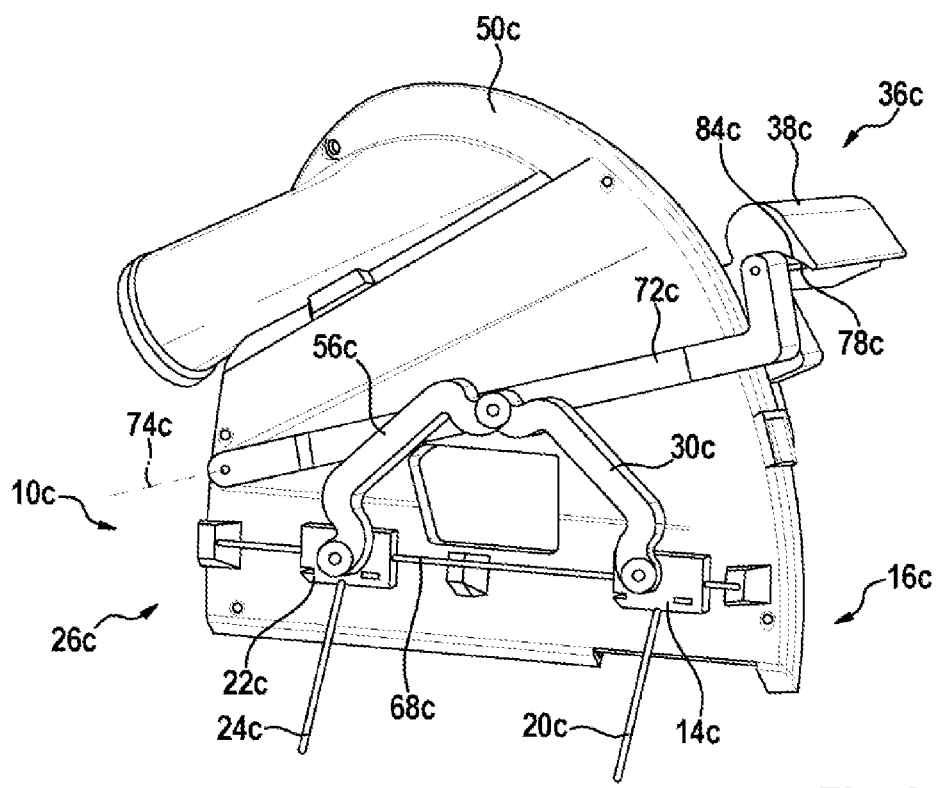
FIG. 8 shows a detailed view of the further, alternative cut length indicating device according to the disclosure from FIG. 7, in a schematic illustration.

FIG. 7 shows a portable machine tool 12c which is designed as a plunge-cut circular saw and comprises at least one cut depth setting unit 36c for setting a depth of cut of a machining tool 18c, and at least one cut length indicating device 10c. The portable machine tool 12c has an at least substantially analogous configuration to the portable machine tool 12a described in FIGS. 1 to 4. The cut length indicating device 10c for the portable machine tool 12c comprises at least one indicating unit 16c, which comprises at least one movably mounted indicating element 14c, for indicating at least one position of a cutting edge of the machining tool 18c on a workpiece (not illustrated specifically here), which is to be machined, in dependence on a set depth of cut of the machining tool 18c. Furthermore, the indicating unit 16c comprises at least one further movably mounted indicating element 22c which, in at least one operating state, for indicating at least one position of a further cutting edge of the machining tool 18c, has a further cutting edge indicating line 24c running at least substantially transversely with respect to a plane of movement of the further indicating element 22c (FIG. 8). The indicating element 14c and the further indicating element 22c have a configuration which is analogous to the indicating elements 14a, 22a described in FIGS. 1 to 4. Furthermore, the indicating element 14c and the further indicating element 22c are mounted on a longitudinal guide element 68c of the cut length indicating device 10c in a translatorily movable manner (FIG. 8).

Figure 9:
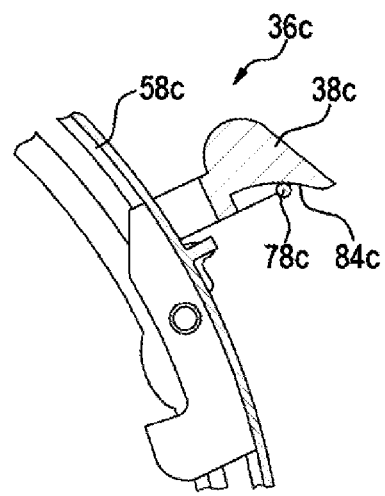
FIG. 9 shows a detailed view of a connecting region of the further, alternative cut length indicating device according to the disclosure on a cut depth setting unit of a portable machine tool, in a schematic illustration.

Furthermore, the cut length indicating device 10c comprises at least one movement coupling unit 26c which connects the indicating element 14c and the further indicating element 22c of the indicating unit 16c to each other in a motionally dependent manner. The movement coupling unit 26c comprises at least one movement coupling element 26c which is mounted pivotably at one end on a support unit 48c and/or on a protection unit 50c of the portable machine tool 12c. A pivot axis of the movement coupling element 28c runs at least substantially parallel to a plunge pivot axis 52c of a machine tool housing 44c of the portable machine tool 12c. The pivot axis here of the movement coupling element 28c, as viewed along a direction running at least substantially perpendicular to a support surface 70c of the support unit 48c, is arranged offset relative to the plunge pivot axis 52c in the direction of a suction extraction coupling element 62c arranged on the protection unit 50c. The movement coupling element 28c is connected at a further end of the movement coupling element 28c to a cut depth setting element 38c of the cut depth setting unit 36c by means of a frictional and/or by means of a form-fitting connection. The cut depth setting element 38c here has at least one curve geometry 84c against which a pick-up element 78c of the movement coupling unit 26c, which pick-up element is arranged on the movement coupling element 28c, bears in at least one state (FIG. 9). However, it is also conceivable that the curve geometry 84c is arranged on the movement coupling element 28c and the pick-up element 78c is arranged on the cut depth setting element 38c. The connection of the movement coupling element 28c and of the cut depth setting element 38c by means of the curve geometry 84c and the pick-up element 78c of the movement coupling unit 26c is provided for compensating for a distance between a center of rotation of the cut depth setting element 38c, which is arranged on the plunge pivot axis 52c, and a center of rotation of the movement coupling element 28c, which is arranged on the pivot axis of the movement coupling element 28c.

A configuration of the curve geometry is dependent on a curve profile, which is necessitated by a movement of the movement coupling element 28c, of a point, which is fixed relative to the body and is arranged on the movement coupling element 28c, and on a curve profile, which is necessitated by a movement of the cut depth setting element 38c, of a point, which is fixed relative to the body and is arranged on the cut depth setting element 38c. For the configuration of the curve geometry 84c, a minimum distance between the two points and an angle between a straight line, which runs through the two points, relative to the support surface 70c or to a horizontal are determined. The configuration of the curve geometry 84c can subsequently be determined therefrom by means of analysis of different vectors.

Figure 10:
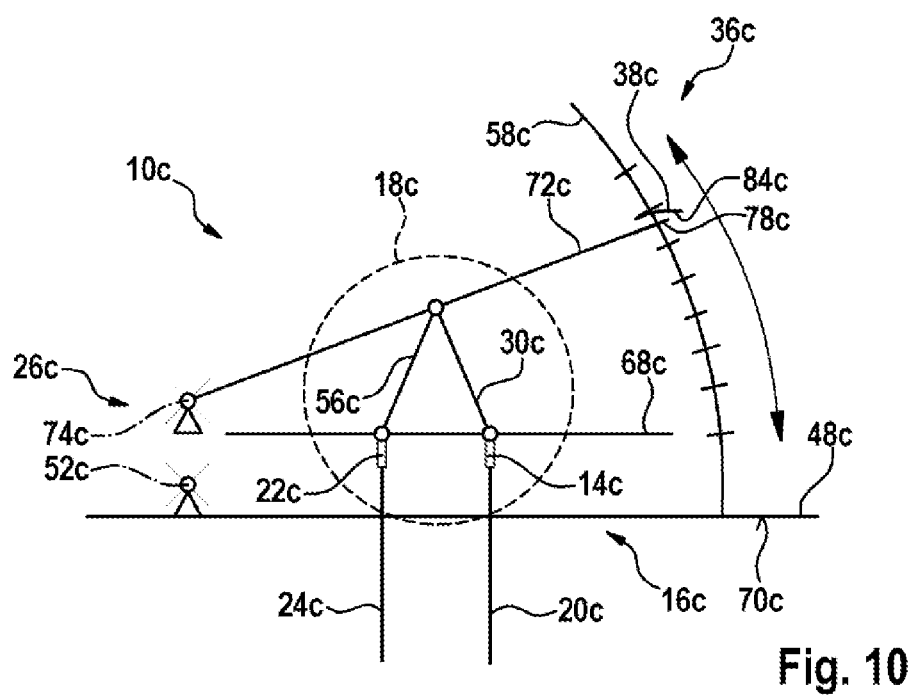
FIG. 10 shows a schematic diagram of the further, alternative cut length indicating device according to the disclosure from FIG. 7, in a schematic illustration.

Furthermore, the movement coupling unit 26c comprises at least one guide element 30c which is mounted pivotably on the further movement coupling element 72c (FIGS. 8 and 10). In addition, the guide element 30c is mounted pivotably on the indicating element 14c.

Furthermore, the movement coupling unit 26c comprises at least one further guide element 56c which is mounted pivotably on the further movement coupling element 72c (FIGS. 8 and 10). The guide element 30c and the further guide element 56c are mounted pivotably here at the same bearing point on the further movement coupling element 72c (FIGS. 8 and 10). The further guide element 56c is furthermore mounted pivotably on the further indicating element 22c.

As a result of setting a desired maximum depth of cut of the machining tool 18b by means of the cut depth setting unit 36b, the pick-up element 78c slides on the curve geometry 84c as soon as the cut depth setting element 38c is moved and the pick-up element 78c are in contact on the curve geometry 84c. The indicating element 14c and the further indicating element 22c are thereby moved by means of interaction of the movement coupling element 28c, of the guide element 30c and of the further guide element 56c. As a result of the translatorially movable mounting of the indicating element 14c and of the further indicating element 22c on the longitudinal guide element 68c, the indicating element 14c and the further indicating element 22c are moved in dependence on a movement of the cut depth setting element 38c. With regard to further features of the portable machine tool 12c and/or of the cut length indicating device 10c, reference should be made to the portable machine tool 12a and/or cut length indicating device 10a described in FIGS. 1 to 4.

Figure 11:
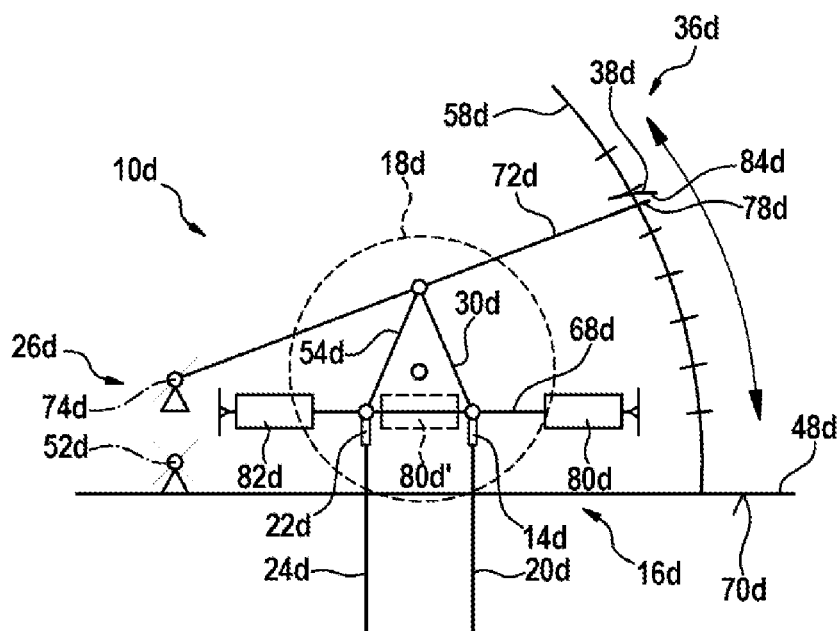
FIG. 11 shows a schematic diagram of a further, alternative cut length indicating device according to the disclosure, in a schematic illustration.

FIG. 11 shows a schematic diagram of a further, alternative cut length indicating device 10d according to the disclosure. The cut length indicating device 10d has an at least substantially analogous configuration to the cut length indicating device 10c described in FIGS. 7 to 10. In contrast to the cut length indicating device 10c, the cut length indicating device 10d has a movement coupling unit 26d which has at least one spring element 80d. Furthermore, the movement coupling unit 26c has a further spring element 82d. The spring element 80d and the further spring element 82d are designed as compression springs. In this case, a spring force of the spring element 80d acts on an indicating element 14d of an indicating unit 16d of the cut length indicating device 10d and a spring force of the further spring element 82d acts on a further indicating element 22d of the indicating unit 16d. The indicating element 14d and the further indicating element 22d are mounted on a longitudinal guide element 68d of the cut length indicating device 10d in a translatorially movable manner. Compensation for tolerance and/or play in the cut length indicating device 10d is made possible by means of the spring element 80d and the further spring element 82d. In addition, it is ensured that, in at least one state, a pick-up element 78d of a movement coupling element 28d of the movement coupling unit 26d bears securely against a curve geometry 84d of a cut depth setting element 38d of a cut depth setting unit 36d of the cut length indicating device 10d.

The spring element 80d is supported at one end on an edge region of the longitudinal guide element 68d, and the spring element 80d is supported at a further end on the indicating element 14d, on a side of the indicating element 14d that faces away from the further indicating element 22d. The further spring element 82d is supported at one end on a further edge region of the longitudinal guide element 68d and the further spring element 82d is supported at a further end on the further indicating element 22d, on a side of the further indicating element 22d that faces away from the indicating element 14d. However, it is also conceivable that, as an alternative to the spring element 80d and the further spring element 82d, the movement coupling unit 26d comprises an individual spring element 80d' (illustrated by dashed lines in FIG. 11) which is arranged between the indicating element 14d and the further indicating element 22d, wherein the individual spring element is designed as a tension spring.

Figure 12:
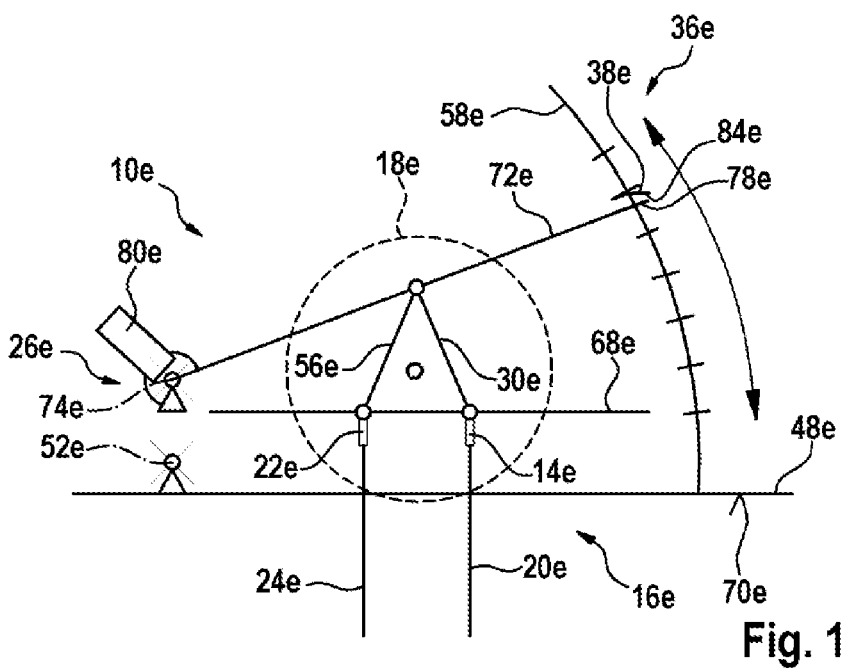
FIG. 12 shows a schematic diagram of a further, alternative cut length indicating device according to the disclosure in a schematic illustration.

FIG. 12 shows a schematic diagram of a further, alternative cut length indicating device 10e according to the disclosure. The cut length indicating device 10e has an at least substantially analogous configuration to the cut length indicating device 10c described in FIGS. 7 to 10. In contrast to the cut length indicating device 10c, the cut length indicating device 10e has a movement coupling unit 26e which has at least one spring element 80e. The spring element 80e is designed as a torsion spring which is arranged on a pivot axis of a movement coupling element 28e of the movement coupling unit 26e and acts upon the movement coupling element 28e with a spring force.

The invention claimed is:

1. A cut length indicating device for a portable machine tool, comprising:
at least one indicating unit including a first movably mounted indicating element configured to indicate a position of a first cutting edge of a cutting tool on a workpiece to be machined based on a set depth of cut of the cutting tool, the first movably mounted indicating element having a first cutting edge indicating line extending transversely with respect to a plane of movement of the first movably mounted indicating element relative to the portable machine tool, the first cutting edge indicating line aligned with the position of the first cutting edge at the set depth of cut,
wherein the at least one indicating unit further includes a second movably mounted indicating element configured for movement relative to the portable machine tool and to the first movably mounted indicating element, the second movably mounted indicating element having a second cutting edge indicating line extending transversely with respect to a plane of movement of the second movably mounted indicating element relative to the portable machine tool, and the second movably mounted indicating element aligned with a position of a second cutting edge of the cutting tool at the set depth of cut, and wherein the first movably mounted indicating element and the second movably mounted indicating element are configured (i) to move away from each other when the set depth of cut is increased, and (ii) to move towards each other when the set depth of cut is decreased.

2. The cut length indicating device as claimed in claim 1, further comprising:

at least one movement coupling unit which connects the first movably mounted indicating element and the second movably mounted indicating element to each other in a motionally dependent manner.

3. The cut length indicating device as claimed in claim 1, further comprising:

at least one movement coupling unit which has:

a guide element, wherein the first movably mounted indicating element is positioned on the guide element; and at least one movement coupling element which is connected in an articulated manner to the guide element.

4. The cut length indicating device as claimed in claim 3, wherein the at least one movement coupling unit further has at least one guide recess configured to guide one end of the guide element which faces away from the at least one movement coupling element.

5. The cut length indicating device as claimed in claim 1, further comprising:

at least one movement coupling unit which includes at least one guide recess which has a curved profile.

6. The cut length indicating device as claimed in claim 1, wherein the at least one indicating unit further includes a laser indicating unit configured to emit the first cutting edge indicating line onto the workpiece and to emit the second cutting edge indicating line onto the workpiece.

* * * * *